United States Patent
Pichumani et al.

(10) Patent No.: US 11,935,228 B2
(45) Date of Patent: Mar. 19, 2024

(54) METHOD TO ACQUIRE A 3D IMAGE OF A SAMPLE STRUCTURE

(71) Applicants: Carl Zeiss SMT GmbH, Oberkochen (DE); Carl Zeiss X-ray Microscopy Inc., Dublin, CA (US)

(72) Inventors: Ramani Pichumani, Palo Alto, CA (US); Christoph Hilmar Graf vom Hagen, Oakland, CA (US); Jens Timo Neumann, Aalen (DE); Johannes Ruoff, Aalen (DE); Thomas Matthew Gregorich, Milpitas, CA (US)

(73) Assignees: Carl Zeiss SMT GmbH, Oberkochen (DE); Carl Zeiss X-ray Microscopy Inc., Dublin, CA (US)

( * ) Notice: Subject to any disclaimer, the term of this patent is extended or adjusted under 35 U.S.C. 154(b) by 178 days.

(21) Appl. No.: 17/510,538

(22) Filed: Oct. 26, 2021

(65) Prior Publication Data

US 2023/0127194 A1 Apr. 27, 2023

(51) Int. Cl.
*G06T 7/00* (2017.01)
*G06T 7/521* (2017.01)
(Continued)

(52) U.S. Cl.
CPC ............. *G06T 7/001* (2013.01); *G06T 7/521* (2017.01); *G06T 7/62* (2017.01); *G06T 11/006* (2013.01);
(Continued)

(58) Field of Classification Search
None
See application file for complete search history.

(56) References Cited

U.S. PATENT DOCUMENTS

| 10,274,420 B2* | 4/2019 | Akhtman ............. H04N 13/214 |
| 2021/0116434 A1* | 4/2021 | De Beenhouwer ... G06T 7/0004 |

FOREIGN PATENT DOCUMENTS

WO    WO 00/25268    5/2000

OTHER PUBLICATIONS

Kasperl et al., "Computed Tomography Metrology in Industrial Research & Development", Materials Testing, vol. 51, No. 6, pp. 405-411 (1-8), Jun. 2009, furnished via IDS.*

(Continued)

*Primary Examiner* — Guillermo M Rivera-Martinez
(74) *Attorney, Agent, or Firm* — Fish & Richardson P.C.

(57) ABSTRACT

A method for acquiring a 3D image of a sample structure includes acquiring a first raw 2D set of 2D images of a sample structure at a limited number of raw sample planes; calculating a 3D image of the sample structure represented by a 3D volumetric image data set; and extracting a measurement parameter from the 3D volumetric image data set. A further number of interleaving 2D image acquisitions are recorded at a further number of interleaved sample planes which do not coincide with previous acquisition sample planes. The steps "calculating," "extracting" and "assigning" are repeated for the further interleaving 2D set until convergence or a maximum number of 2D image acquisitions is recorded. A projection system used for such method comprises a projection light source, a rotatable sample structure holder and a spatially resolving detector. Such method can also be used to acquire virtual tomographic images of a sample.

26 Claims, 4 Drawing Sheets

(51) Int. Cl.
   *G06T 7/62* (2017.01)
   *G06T 11/00* (2006.01)
(52) U.S. Cl.
   CPC .......... *G06T 2207/10028* (2013.01); *G06T 2207/10084* (2013.01); *G06T 2207/10116* (2013.01); *G06T 2207/30148* (2013.01); *G06T 2211/424* (2013.01)

(56) References Cited

OTHER PUBLICATIONS

Welkenhuyzen et al.., "Industrial Computer Tomography for Dimensional Metrology: Overview of Influence Factors and Improvement Strategies", Optimess2009, pp. 1-8, 2009, furnisehd via IDS.*
Hsieh J., "Different Generations of CT Scanners", *Computed Tomography Principles, Design, Artifacts, and Recent Advances*, Chapter 1.3, pp. 12-18 and 90-98, SPIE press, 2003.
Kasperl et al., "Computed Tomography Metrology in Industrial Research & Development", *Materials Testing*, vol. 51, No. 6, pp. 405-411(Jun. 2009).
Korner et al., "Simulation of continuous high aspect ratio tomography for surface topography measurements", DXCT 2019, Huddersfield.
Schmidt et al., "Novel sample preparation and High-Resolution X-ray tomography for Package FA", 2017 IEEE 24th International Symposium on the Physical and Failure Analysis of Integrated Circuits (IPFA), 2017, pp. 1-4. doi: 10.1109/IPFA.2017.8060174.
Sylvester et al., "3D X-Ray Microscopy: A Non Destrictive High Resolution Imaging Technology That Replaces Physical Cross-Sectioning For 3DIC Packaging", *Proceedings of the 24th Annual IEEE/SEMI Advanced Semiconductors Manufacturing Conference (ASMC 2013)*, Saratoga Springs, NY (May 14-16, 2013).
Welkenhuyzen et al., "Industrial Computer Tomography for Dimensional Metrology: Overview of Influence Factors and Improvement Strategies", *Optimess2009*, (2009).
The International Search Report and Written Opinion of the International Searching Authority for International Application No. PCT/EP2022/077969, dated Feb. 7, 2023.

* cited by examiner

METHOD TO ACQUIRE A 3D IMAGE OF A SAMPLE STRUCTURE

TECHNICAL FIELD

The invention refers to a method to acquire a 3D image of a sample structure by acquiring a set of 2D images of differently oriented sample planes. Further, the invention refers to a projection system for acquiring tomographic images of a sample using such a method and to a data processing system comprising means for acquiring virtual tomographic images of a sample using such a method.

BACKGROUND 3D imaging of a sample structure by acquiring a set of 2D images of differently oriented sample planes is known in particular with respect to 3D X-ray imaging. In that respect, it is referred to Kasperi S., Hiller J., Krumm M., Computed tomography metrology in industrial research and development, Materials Testing, Jun. 1, 2009; 51(6):405-11 and to Körner, L., Lawes, S., Senin, N., Leach, R., Simulation of continuous high aspect ratio tomography for surface topography measurements, paper shown in DXCT 2019, Huddersfield. Further, respective projection systems and acquisition methods are known from Welkenhuyzen, F., Kiekens, K., Pierlet, M., Dewulf, W., Bleys, P. & Kruth, J.-P. and Voet, A., Industrial computer tomography for dimensional metrology: Overview of influence factors and improvement strategies, OPTIMESS 2009 or from Hsieh J., Computed tomography principles, design, artifacts, and recent advances, SPIE press, 2003.

SUMMARY

An aspect of the present invention is to improve such a method to increase a sample throughput. This aspect is achieved by a method having the features of claim 1.

For many industrial metrology applications based on 3D imaging modalities, sample throughput is a critical factor that impacts the cost and viability of a given modality. When performing measurements on structures found in 3D reconstructed tomographic data or with 2D cross sectional images of such data (e.g., X-ray CT data), it is not known a priori the exact number of projection images that need to be acquired for a given sample to achieve a specified level of imaging accuracy. If too few projection images are acquired, the measurements will be inaccurate due to poor signal to noise ratio (SNR) and large imaging artifacts. If too many projections are acquired, then the data acquisition time becomes unacceptable. As identified during the invention as disadvantageous, prior art methods derive the projection count based on worst case accuracy requirements from experimental measurements and theoretical calculations. As was further recognized, these ad hoc and quasi-systematic approaches suffer from the drawback that they can't account for all possible variations of imaging parameters such as beam energy, and sample object attributes such as size, geometry, density, topology, and composition. As a result, the number of acquired images in the prior art is over-specified to meet the worst-case SNR and contrast to noise ratio (CNR) profiles of known sample types and measurement types. This results in longer image acquisition times to guarantee a minimum accuracy level. These disadvantages and drawbacks are avoided by the invention. In particular, no additional margin needs to be built-in to account for unknown variations of these sampling parameters that occur in real world scenarios. For example, it can be exploited that measuring the volume of a large moderately dense object may require an order of magnitude fewer projection images than measuring the critical dimension of a fine wisp-like structure.

In particular, it has been found that in the first acquisition of a raw 2D set a relatively small number of raw sample planes may be used. Such limited number of raw sample planes can be very small, e.g. 2, or can be larger than 2, e.g. 2 to 4, or can be larger than 5, larger than 10, can be in the range between 15 and 20 raw sample planes or can be larger. As a rule, such number of raw sample planes used in acquiring the first raw 2D set is smaller than 100 or smaller than 50. Such limited number of raw sample planes can depend on the complexity of the sample structure to be imaged. As a rule, a lower complex sample structure, e.g. a spherical structure, would require a lower number and more complex structure, e.g. a cube or a copper micropillar interconnect, requires a larger number of raw sample planes.

An example for the measurement parameter which is extracted during the method is the volume of a certain sample structure or of a plurality of selected sample structures or sample areas. As a rule, the height, the width and/or the depth of a sample structure is an example for the measurement parameter to be extracted during the method. Sample structures to be imaged can be a bond line, a pad alignment and/or an extruded solder, in particular of a microbonded semiconductor device. In particular, pad alignment of copper micropillar pads and/or a pad width can be checked with the imaging method.

Extracting the measurement parameter can be done in particular by help of a calculation step using a 3D reconstruction algorithm.

The iterative repetition of the steps "calculating," "extracting" and "assigning" can be done with a certain number of iteration steps. Such number can be in the range between 2 and 10, in particular in the range between 2 and 8 or in the range between 3 and 5. The number of sample planes can increase between subsequent iteration steps by, e.g., 20% to 200%. A typical sequence of sample plane numbers in a sequence of five iteration steps can be 20, 40, 60, 80 and 100. In the first step of acquiring the raw 2D set, in this example 20 raw sample planes were used and in the subsequent iteration steps 40, 60, 80 and 100 sample planes. The progression of sample plane numbers during the subsequent iteration steps can be arithmetic rather than geometric.

An example for the convergence criterion used in the method is a criterion derived from the comparison of a normalized difference of an average measured value of the last N iterations with an average value of the previous N iterations. N can be in the range between 1 and 5 and can be at least 2.

For repetitive sample measurements, the algorithm can be accelerated by recording the projection set sizes for a predetermined set of samples and use the median or max as a starting seed value. This seed value could also be used as a fixed set size for all samples if the variation is minimal.

A repetition of acquisitions can take place at previously acquired sample planes in order to reduce a noise at a respective sample plane angle by averaging multiple images at this given angle.

An acquisition at a specific sample plane can take place with a specific acquisition time. Such acquisition times can differ to reduce noise where appropriate. For instance, shallow near-planar sample planes close to a value of 0 degrees can be acquired with a longer exposure time in order to reduce the noise in the respective images.

The method according to claim 2 can further increase the speed of the method and therefore the sample throughput.

For example, in case a large number of qualitatively similar sample structures are imaged, it may turn out that such sample structure needs a certain number of raw sample planes in the initial acquisition of the first raw 2D set. For subsequent image measurement of such sample structures, the method automatically then can be started with this certain number of raw sample planes increasing the speed of the method. As an example, if without knowledge of a convergence prediction parameter, an initial number of raw sample planes, e.g., is 20 and it turns out that for imaging a certain sample structure at least 40 raw sample planes are needed to start the convergence, then in subsequent respective imaging acquisition methods the convergence prediction results in a subsequent initial number of raw sample planes of 40.

A parallel process performance according to claim 3 further increases the speed of the method and therefore the sample throughput.

A convergence prediction parameter calculation according to claim 4 improves the speed of the iteration convergence and thus reduces the number of subsequent acquisition sets and therefore increases the speed of the method. Such convergence prediction parameter calculation can be done via machine learning.

Further HART projection angles selected according to claim 5 can be used as additional acquisition sample planes to improve the method speed in particular for certain, typified sample structures. With respect to the HART (high aspect ratio tomography) scheme it is referred to Körner, L., Lawes, S., Senin, N., Leach, R., Simulation of continuous high aspect ratio tomography for surface topography measurements, paper shown in DXCT 2019. Huddersfield, and to the references mentioned there.

The HART projection spacing is an example of a static image acquisition technique to improve the resolution of high-aspect ratio structures in a sample. HART projections can improve image quality for high-aspect ratio samples.

The advantages of a projection system according to claim 6 correspond to those of the method discussed above.

An imaging optics according to claim 7 allows in particular a more specific sample area imaging. Depending on the embodiment of the projection system, such imaging optics also can be omitted.

X-ray projection light according to claim 8 gives a high imaging resolution. In the light path upstream of the detector, a scintillator material, in particular a scintillator layer can be present to convert X-ray projection light into ultraviolet (UV) or visible light which is accessible by high sensitive detectors.

With a data processing system according to claim 9, the method can be performed by a virtual system using a digitally represented, i.e. non-physical sample structure. This can be used to improve acquisition or calculation routines of the method.

By help of a computer-aided design (CAD) module according to claim 10, CAD data and/or CAD models of the samples can be generated and/or used by the data processing system.

BRIEF DESCRIPTION OF DRAWINGS

Exemplified embodiments of the invention hereinafter are described with reference to the accompanying drawings. It is shown in FIG. 1 an X-ray projection system for acquiring 3D tomographic images of semiconductor structure samples via acquiring a set of 2D images of differently oriented sample planes with a respective acquisition method.

DETAILED DESCRIPTION

Figure 1:
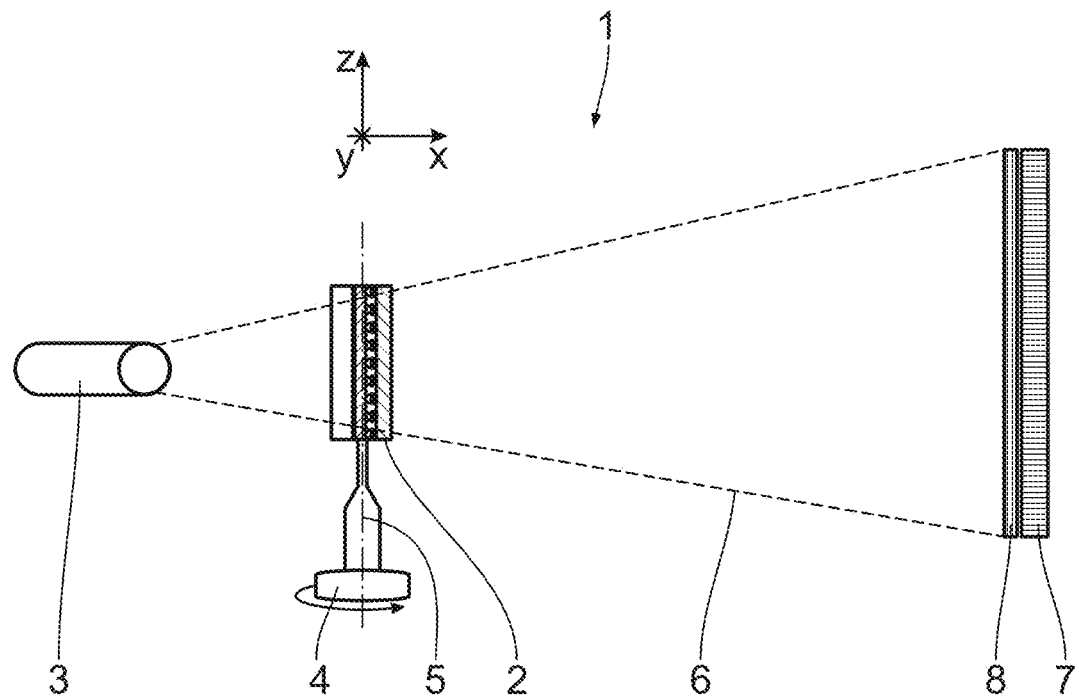

FIG. 1 shows main components of a projection system 1 for acquiring tomographic images of a sample 2 by acquiring a set of two-dimensional (2D) images of differently oriented sample planes.

The sample 2 in the shown embodiment is a semiconductor structure.

The projection system 1 comprises a projection light source 3. The projection light source 3 is embodied as an X-ray source.

The sample 2 is held by a sample structure holder 4 which is rotatable around at least one sample rotating axis 5.

To facilitate the description of the structures and their orientation, in the following a Cartesian xyz coordinate system is used. In FIG. 1, the x-axis runs to the right. The y-axis runs perpendicular to the drawing plane of FIG. 1 away from the viewer. The z-axis runs upwards in FIG. 1.

The sample rotating axis 5 runs parallel to the z-axis.

The sample structure holder 4 holds the sample 2 in a light path 6 of the projection light generated by the projection light source 3.

In the light path 6 after the sample 2 a spatially resolving detector 7 is arranged which is embodied as a CCD or a CMOS detector. A detection plane of the detector 7 is parallel to the yz-plane. The rotation axis 5 of the sample holder 4 runs parallel to such detection plane.

Between the sample 2 and the detector 7 and in the vicinity of the detector 7, a scintillator layer 8 is arranged in the light path 6. The scintillator layer 8 serves to convert a wavelength of the projection light into a wavelength detectable by the detector 7, in particular into a UV and/or visible wavelength.

Figure 2:
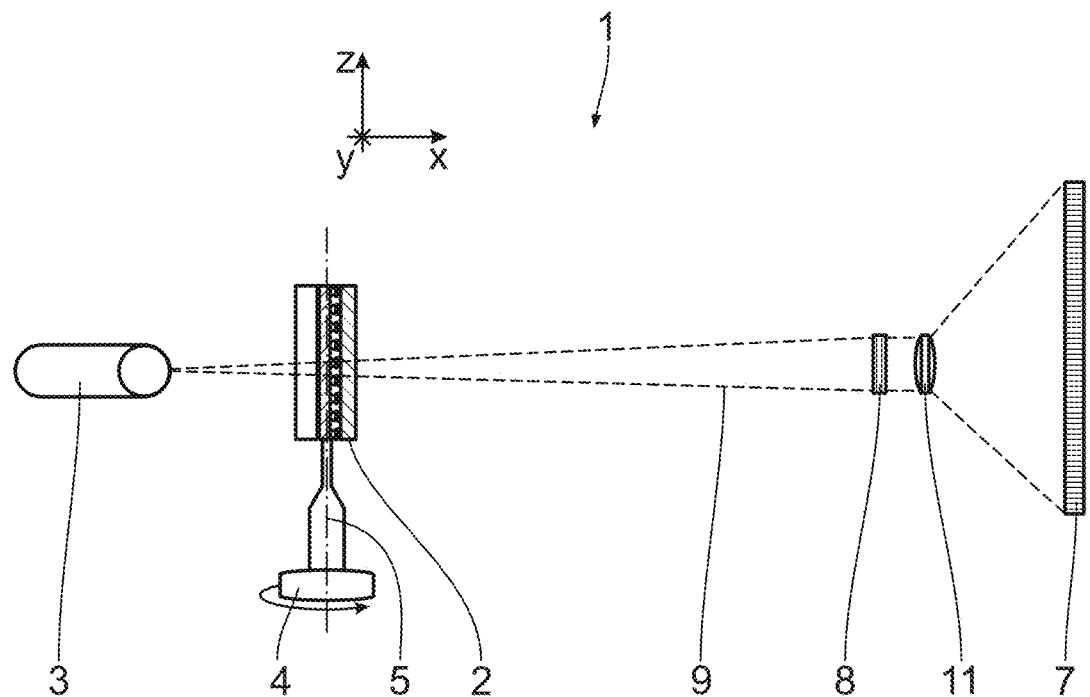
FIG. 2 in a view similar to that of FIG. 1 another embodiment of a respective X-ray projection system.

FIG. 2 shows another embodiment of such projection system 1. Components and functions which already have been discussed above with reference to FIG. 1 show the same reference numerals and are not discussed in detail again.

As compared to the respectively broad emittance angle of the light path 6 of the projection system 1 of FIG. 1, the FIG. 2 projection system 1 has a narrow, more collimated light path 9 running chiefly parallel to the x-direction. Such light path 9 illuminates only a target area 10 of the sample 2. For choosing such target area 10, the sample structure holder 4 further can be translatable in the z- and/or in the y-direction.

Further, the FIG. 2 projection system 1 includes an imaging optics 11 to image the sample target area 10 illuminated by the projection light to the detector 7. Such imaging optics 1 can be embodied as a single lens or as a combination of lenses and/or mirrors. The imaging optics 11 is arranged between the scintillator layer 8 and the detector 7. Due to the collimated light path 9, a lateral extension of the scintillator layer 8 in the y- and in the z-direction is small as compared to the scintillator layer 8 of the FIG. 1 embodiment without the imaging optics 11.

In principle, the general layout of such projection systems 1 according to FIGS. 1 and 2 are known, e.g., from Kasperl S., Hiller J., Krumm M., Computed tomography metrology in industrial research and development, Materials Testing, Jun. 1, 2009; 51(6):405-11. Further, respective projection systems and acquisition methods are known from Welkenhuyzen, F., Kiekens, K., Pierlet, M., Dewulf, W., Bleys, P. & Kruth, J. & Voet, A., Industrial computer tomography for dimensional metrology: Overview of influence factors and improvement strategies, OPTIMESS 2009, from Hsieh J., Computed tomography principles, design, artifacts, and recent advances, SPIE press, 2003, or from Sylvester et al., 3D X-ray Microscopy: A non-destructive high resolution imaging technology that replaces physical cross-sectioning for 3D IC packaging, proceedings of the 24$^{th}$ annual IEEE/ SENI advanced semiconductors manufacturing conference (ASMC 2013), May 14-16, 2013, Saratoga Springs, New York.

The projection system 1 according to FIG. 1 or 2 is used in a method to acquire a 3D image of the structure of the sample 2 by acquiring a set of 2D images of differently oriented sample planes. Such sample plane orientation in FIGS. 1 and 2 is parallel to the yz-plane.

Figure 3:
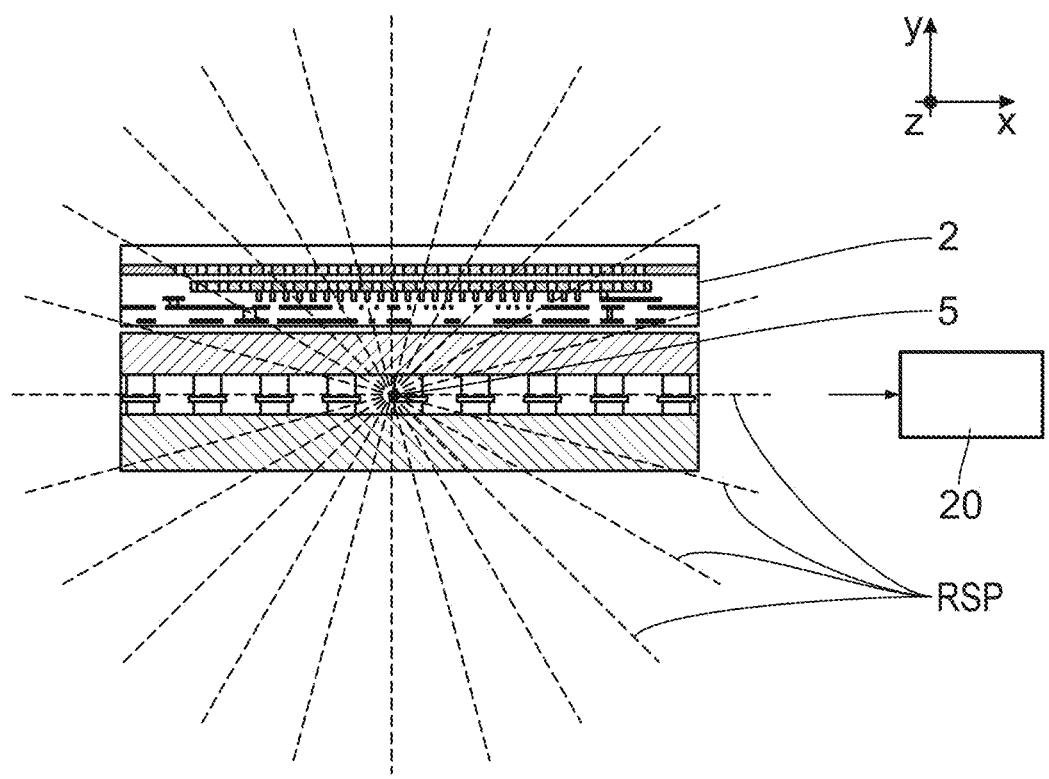
FIG. 3 a set of different sample orientations as nominal projection angles used in a starting step of the method to acquire a first raw 2D set of 2D images of the semiconductor structure.

FIG. 3 shows examples of raw sample plane orientations which are used during a first step of the method wherein a first raw 2D set of 2D images of the sample structure is acquired by recording a limited number of 2D image acquisitions at a respectively assigned limited number of sample planes. In FIG. 3, the rotation axis 5 runs perpendicular to the drawing plane. The sample plane orientation of the sample 2 shown in FIG. 3 is in the xz-plane which is assigned as "0 deg" in FIG. 3. The limited number of raw sample planes and of corresponding orientations of the sample 2 are shown in FIG. 3 with assigned angle values 90 deg, 75 deg, 60 deg, 45 deg, 30 deg, 7.5 deg, 0 deg, −15 deg, −30 deg, −45 deg, −60 deg. −75 deg. Such orientations also are referred to as sample plane orientations. For example, the sample plane orientation 90° corresponds to an orientation of the sample 2 parallel to the yz-plane.

Exemplified ones of this limited number of sample planes used during the initial first acquisition are denoted in FIG. 3 as raw sample planes RSP.

Accordingly, during the first raw 2D set acquiring step of the acquisition method, an acquisition sequence is performed, e.g., according to table 1 below.

TABLE 1

Sequence of sample plane orientations used during first raw 2D set acquisition

| Projection # | Angle (deg) |
|---|---|
| 1 | 0 |
| 2 | 2.5 |
| 3 | 5 |
| 4 | 7.5 |
| 5 | 30 |
| 6 | 45 |
| 7 | 60 |
| 8 | 75 |
| 9 | 90 |

During the respective 2D image acquisition, a 2D image at the respective sample orientation is recorded via the detector 7.

In a next step, a raw 3D image of the structure of the sample 2 is calculated from the acquired first raw 2D set. Such raw 3D image is represented by a 3D volumetric image data set. Such calculation of a 3D image from a 2D set of 2D images of a sample structure is known from the above mentioned reference Kasperl S. et al. and the citations given there.

Figure 6:
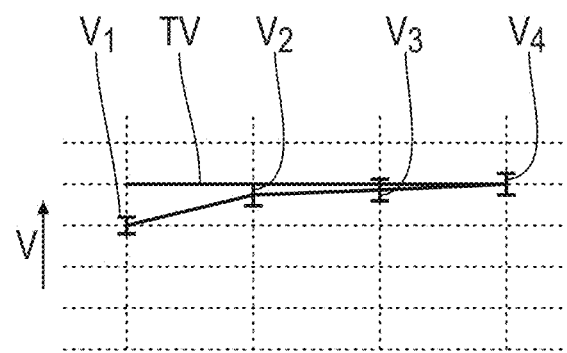
FIG. 6 a graph showing a convergence of an extracted measurement parameter ("measured volume") during the iteration.

From such calculated 3D volumetric image data set, a measurement parameter then is extracted during the method. Such measurement parameter can be the volume of a specific structure of the sample 2. FIG. 6 shows in arbitrary units a result $V_1$ of such first measurement parameter extraction in a graph. The vertical axis of such FIG. 6 graph shows the volume V in arbitrary units. The horizontal axis of such FIG. 6 graph shows the number of measurements, i.e. the number of iterations of the method. As a horizontal line TV, the "true volume" of the sample structure is shown in FIG. 6, i.e. the theoretically correct value of a perfect measurement. As can be seen, the measurement parameter $V_1$ deviates from the perfect measurement parameter TV.

FIG. 6 is a graphical representation of a further method step, namely the assignment of the extracted measurement parameter $V_i$ to the number i of 2D image acquisitions reported during the acquisition of the method.

Now, a further interleaving 2D set of 2D images of the sample structure is acquired during the acquisition method. This is done by recording a further number of interleaving 2D image acquisitions at a respectively assigned further number of interleaved sample planes and respective orientations of the sample 2 which do not coincide with the previous acquisition sample planes.

Table 2 below shows an example of such interleaving 2D set of 2D images, i.e. shows an example of an assigned further number of interleaved sample planes.

TABLE 2

Augmented projection angles (sample plane orientations) for images acquired during second iteration of the acquisition algorithm

| Projection # | Angle (deg) |
|---|---|
| 1 | 0 |
| 2 | 2.5 |
| 3 | 5 |
| 4 | 7.5 |
| 5 | 15 |
| 6 | 22.5 |
| 7 | 30 |
| 8 | 37.5 |
| 9 | 45 |

TABLE 2-continued

Augmented projection angles (sample plane orientations) for images acquired during second iteration of the acquisition algorithm

| Projection # | Angle (deg) |
|---|---|
| 10 | 52.5 |
| 11 | 60 |
| 12 | 67.5 |
| 13 | 75 |
| 14 | 82.5 |
| 15 | 90 |

In addition to the sample orientation angle values shown above with respect to the initial raw 2D set acquisition step (compare table 1) further interleaved sample planes 15 deg (projection number 5), 22.5 deg (projection number 6), 37.5 deg (projection number 8), 52.5 deg (projection number 10), 67.5 deg (projection number 12) and 82.5 deg (projection number 14) are set via a respective rotation of the sample structure holder 4 around the rotation axis 5 and at these orientations, a further 2D image acquisition is carried out.

During such further interleaving acquisition step, projections number 5, 6, 8, 10, 12 and 14 therefore are performed.

After this, a 3D image of the sample structure now is calculated for the further interleaving 2D set (i.e. is calculated from the fifteen projections shown in table 2).

From the respectively calculated 3D volumetric image data set, a further measurement parameter is extracted including the information of the interleaving 2D images.

FIG. 6 shows the result of such extracted measurement parameter, namely the volume $V_2$ obtained after such second measurement. The measurement parameter value $V_2$ as compared to $V_1$ now is closer to the true volume TV.

As a supportive measure to improve a signal to noise ratio (SNR) during the image acquisition, high-speed images with short exposure times can be acquired with an increasing of oversamples at the respective angular positions of the sample planes.

In a comparison step of the acquisition method, the actual extracted measurement parameter, here the measured volume $V_2$, is compared with the last extracted measurement parameter, i.e. measured volume $V_1$, to check whether a convergence criterion is met. Such comparison in a simplest version can be just a check whether there is a difference between both measured volumes $V_2$ and $V_1$ which is above a difference threshold value. As an example, such convergence criterion can be based on a comparison of a normalized difference of an average measured value of the last N iterations with the average value of the previous N iterations. Once such normalized difference is smaller than a pre-defined threshold, the convergence criterion is met. This can be expressed by the formula:

$$\left\| \frac{\sum_{j=i-2N+1}^{i-N} M_j - \sum_{j=i-N+1}^{i} M_j}{\sum_{j=i-N+1}^{i} M_j} \right\| < \epsilon$$

N could be 1 and thus it is possible to consider just a current measured value with a previous one. To avoid a negative of noise or of monotonicity assumptions regarding the measurement function, N should be chosen to be at least 2. A typical value of r, the pre-defined threshold, could be in the range of 0.01 to 0.05.

As another example, a convergence criterion can be met in case, the difference between the measured volumes $V_i$ and $V_{i+1}$ is below 10% of a nominal value.

In mathematical terms, this can be expressed as $$(V_{i+1}-V_i)^2/(V_{i+1}+V_i)^2 \leq 0.1$$

The boundary value 0.1 shown on the right hand side of the equation can be different and can be larger, i.e. 0.2, or can be smaller, i.e. 0.5, 0.25, 0.2, 0.1, 0.05, 0.01 or even smaller.

In case the convergence criterion is not met, the steps "2D image acquisition," "3D image calculation," "measurement parameter extraction," "extracted measurement parameter assignment to iteration number" and "comparison of the actual extracted measurement parameter with the last one measured" are repeated for a further interleaving 2D set including a further number of interleaving 2D image acquisitions at a respectively assigned further number of interleaved sample planes which do not coincide with the previous acquisition sample planes.

Figure 4:
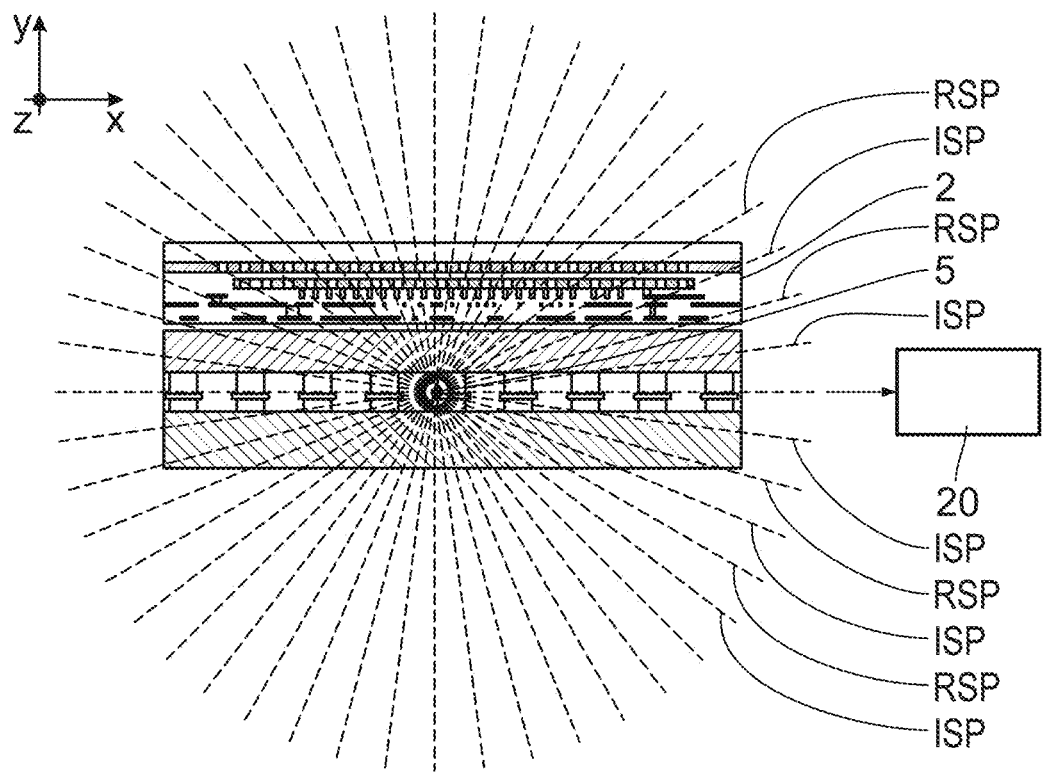
FIG. 4 in a view similar to that of FIG. 3 additional projection angles which are interleaved to augment the nominal projection images acquired in the first raw acquisition step during a further interleaving 2D acquisition step which can be performed iteratively.
Figure 5:
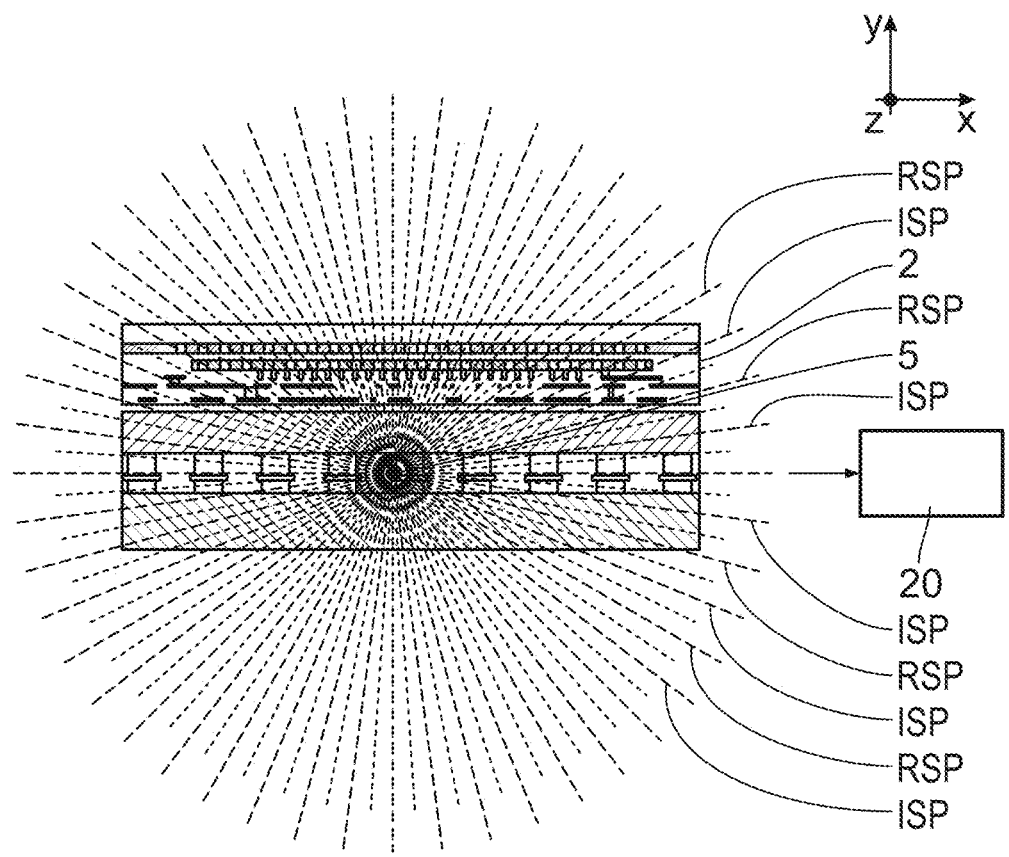
FIG. 5 again in a view similar to FIGS. 3 and 4 further additional projection angles which are interleaved in a further iteration step to further augment the nominal projection images.

Such further interleaved sample planes exemplified are shown in FIGS. 4 and 5. Exemplified interleaved sample planes used in this further interleaving acquired step in FIG. 4 are denoted as interleaved sample planes ISP. In particular, between the raw sample planes at 7.5 deg and 30 deg, there are two interleaved sample planes at 15 deg and 22.5 deg.

Figure 7:
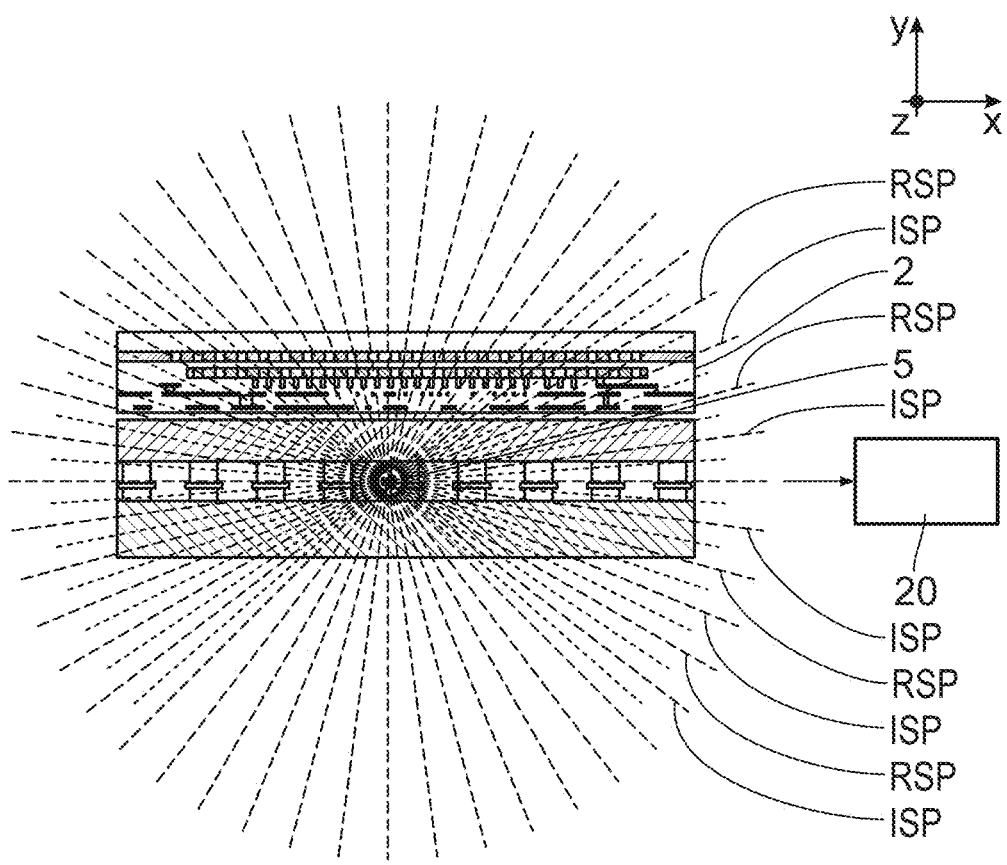
FIG. 7 again in a view similar to that of FIG. 3 to 5 another set of interleaved projection angles using adaptive HART images to further improve a measurement convergence.

FIG. 7 shows another alternative for further interleaved sample planes which do not coincide with previous acquisition sample planes which can be used during a further iteration of the acquisition method. Here, adjacent to the orientation value "0 deg" further sample planes are interleaved which correspond to HART (high aspect ratio tomography) projection angle orientations with respect to high aspect ratio tomography (HART) it is referred to Körner, L., Lawes, S., Senin, N., Leach, R., Simulation of continuous high aspect ratio tomography for surface topography measurements, paper shown in DXCT 2019, Huddersfield.

FIG. 6 shows measurement volumes $V_3$, $V_4$ which are extracted during such further interleaved iterations. After a comparison between the values $V_3$ and $V_4$, the convergence criterion is met and the iteration stops. The measured volume $V_4$ is in good coincidence with the true volume TV.

Alternatively, in case the convergence criterion is not met after a given maximum number of 2D image acquisitions, i.e. a maximum number of iterations, the acquisition also is stopped and the measurement parameter extracted in the last iteration is outputted. Such maximum number of iterations can be less than 25 and can even be less than 10.

The measurement parameter $V_i$ extracted in the last iteration step i is outputted and further a total number of the recorded 2D image acquisitions, i.e. the number of iterations also is outputted. The 3D image acquired during the last iteration is the 3D volumetric image data set which is the result of the method.

During the method, a sensitivity of a dependency of the value of the measurement parameter from a position of a sample plane, i.e. a sample angle, can be determined. Depending on the sample structure, for example the extracted measurement parameter can be sensitive for angles in the range between 15 deg and 30 deg. In that case, positions of interleaved sample planes can be chosen during the next acquisition step depending on such sensitivity determination and in the exemplified case can be chosen to be positioned in this angular range between 15 deg and 30 deg.

During the acquisition method, the steps "calculating" and/or "extracting" and/or "acquiring" can be performed in parallel. As an example, the acquisition can be triggered prior to the decision whether—after obtaining the comparison result—such further acquisition indeed is necessary or not. In other words, a next iteration is started prior to the determination whether it really is necessary to improve the measurement parameter result. As a result, a faster overall method is performed.

Further, a convergence prediction parameter can be calculated to determine a next further number and sequence of interleaving 2D image acquisitions to be recorded in a first acquisition of a 3D imaging acquisition to be performed with a sample of at least partially known structure.

As an example, a number of sample plane orientations according to table 3 below has been proven to output a sufficiently adequate measurement parameter result (convergence prediction) for a specific sample structure "copper micropillar interconnects":

TABLE 3

A sample set of nominal projection angles for a hypothetical semiconductor package with copper micropillar interconnect

| Projection # | Angle (deg) |
|---|---|
| 1 | 0 |
| 2 | 2 |
| 3 | 4 |
| 4 | 8 |
| 5 | 15 |
| 6 | 22.5 |
| 7 | 30 |
| 8 | 37.5 |
| 9 | 45 |
| 10 | 52.5 |
| 11 | 60 |
| 12 | 67.5 |
| 13 | 75 |
| 14 | 82.5 |
| 15 | 90 |

In case a further sample structure having comparable copper micropillar interconnects is to be measured via the 3D image acquisition method, such sequence of projection numbers can be used as a starting acquisition sequence to acquire a first raw 2D set of 2D images during the method, i.e. as the first iteration. As compared to the set of sample orientation angles according to table 1, this can lead to a faster convergence and to an overall faster acquisition method. Such convergence prediction parameter calculation can be done using machine learning processes.

When measuring such copper micropillar interconnects thus a higher number of raw sample planes during the initial acquisition step can be used as the number which above was described referring to table 1. Whereas in this previously explained method nine raw sample planes were used (compare table 1), in such a adapted method, in particular by use of a convergence prediction parameter, now fifteen initial raw sample planes are used as shown above in table 3.

As another example, when typically during a measurement of a micropillar structure 20 initial raw sample planes are used and it turns out that a certain lot of such micropillar structures need a higher initial raw sample plane number for fast convergence, then such higher number, e.g. 40 initial raw sample planes can be used during the first acquisition step when imaging such micropillar structures.

Table 4 below shows further examples regarding a set of raw sample planes (RSP, as shown in FIG. 3) and a combination of such RSP set with interleaved sample planes (ISP, as shown in FIGS. 4, 5 and 7), each represented by a degree value of a projection angle for adaptive imaging. Such degree value is measured with respect to the xz-plane in the respective FIGS. 3, 4, 5 and 7.

Those sample planes tabled in table 4 coincide with those sample planes depicted via dashed lines in the respective figure.

TABLE 4

Projection angle values for adaptive imaging (raw sample planes, FIG. 4 and raw/interleaved sample planes, FIG. 4, 5 and 7)

| Sample plane number | FIG. 3 | FIG. 4 | FIG. 5 | FIG. 7 |
|---|---|---|---|---|
| 1 | 0 | 0 | 0 | 0 |
| 2 | 15 | 7.5 | 3.75 | 3.75 |
| 3 | 30 | 15 | 7.5 | 7.5 |
| 4 | 45 | 22.5 | 11.25 | 11.25 |
| 5 | 60 | 30 | 15 | 15 |
| 6 | 75 | 37.5 | 18.75 | 18.75 |
| 7 | 90 | 45 | 22.5 | 22.5 |
| 8 | 105 | 52.5 | 26.25 | 26.25 |
| 9 | 120 | 60 | 30 | 30 |
| 10 | 135 | 67.5 | 33.75 | 33.75 |
| 11 | 150 | 75 | 37.5 | 37.5 |
| 12 | 165 | 82.5 | 41.25 | 41.25 |
| 13 |  | 90 | 45 | 45 |
| 14 |  | 97.5 | 48.75 | 52.5 |
| 15 |  | 105 | 52.5 | 60 |
| 16 |  | 112.5 | 56.25 | 67.5 |
| 17 |  | 120 | 60 | 75 |
| 18 |  | 127.5 | 63.75 | 82.5 |
| 19 |  | 135 | 67.5 | 90 |
| 20 |  | 142.5 | 71.25 | 97.5 |
| 21 |  | 150 | 75 | 105 |
| 22 |  | 157.5 | 78.75 | 112.5 |
| 23 |  | 165 | 82.5 | 120 |
| 24 |  | 172.5 | 86.25 | 123.75 |
| 25 |  |  | 90 | 127.5 |
| 26 |  |  | 93.75 | 131.25 |
| 27 |  |  | 97.5 | 135 |
| 28 |  |  | 101.25 | 138.75 |
| 29 |  |  | 105 | 142.5 |
| 30 |  |  | 108.75 | 146.25 |
| 31 |  |  | 112.5 | 150 |
| 32 |  |  | 116.25 | 153.75 |
| 33 |  |  | 120 | 157.5 |
| 34 |  |  | 123.75 | 161.25 |
| 35 |  |  | 127.5 | 165 |
| 36 |  |  | 131.25 | 168.75 |
| 37 |  |  | 135 | 172.5 |
| 38 |  |  | 138.75 | 176.25 |
| 39 |  |  | 142.5 |  |
| 40 |  |  | 146.25 |  |
| 41 |  |  | 150 |  |
| 42 |  |  | 153.75 |  |
| 43 |  |  | 157.5 |  |
| 44 |  |  | 161.25 |  |
| 45 |  |  | 165 |  |
| 46 |  |  | 168.75 |  |
| 47 |  |  | 172.5 |  |
| 48 |  |  | 176.25 |  |

Regarding this table 4 embodiment, 12 raw sample planes RSP are used in the embodiment of FIG. 3 example.

This RSP set of FIG. 3 is supplemented by additional 12 interleaved sample planes ISP in the embodiment of FIG. 4, by 36 interleaved sample planes in the embodiment of FIG. 5 and by 26 interleaved sample planes in the embodiment of FIG. 7.

Figure 8:
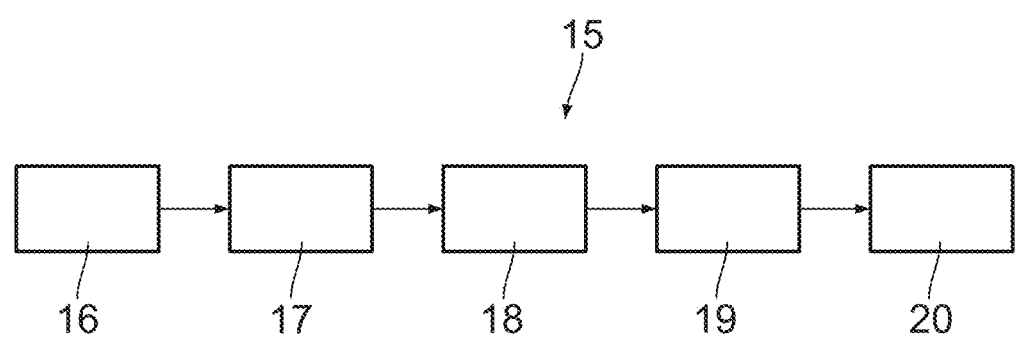
FIG. 8 schematically main steps of a method performed by a data processing system to acquire a 3D image of a semiconductor structure using interleaved 2D sets of 2D images and being performed as an adaptive imaging algorithm applied to a virtual system simulating, e.g., X-ray images.

An embodiment for the above mentioned acquisition methods may not be physical. As shown in FIG. 8 of a physical projection system a data processing system 15 can be used.

Such data processing system 15 can include a CAD module 16 to process CAD data of a virtual sample to be imaged by the data processing system 15. CAD data can be set from the CAD module 16 to a virtual system 17 of the data processing system 15. Such virtual system 17 can create 2D projection images 18 which are reconstructed into 3D data sets 19 for which in a measurement module 20 of the data processing system 15 a respective measurement parameter is extracted. All the steps discussed above with respect to the physical projection system 1 also can be performed within the data processing system 15.

With such data processing system 15, the quality of the data processing steps can be checked and improved.

The features described above related to processing of data can be implemented by an electronic data processing apparatus, e.g., the data processing system 15, which can be implemented in digital electronic circuitry, computer hardware, firmware, software, or in combinations of them. The features related to processing of data include, e.g., calculating a 3D image of the sample structure from the first raw 2D set, extracting a measurement parameter from the 3D volumetric image data set, assigning the extracted measurement parameter to the number of 2D image acquisitions recorded during the acquisition step, comparing the actual ($V_{i+1}$) extracted measurement parameter with the last extracted measurement parameter ($V_i$), determining a sensitivity of a dependency of a value of the measurement parameter from a position of a sample plane, choosing the positions of interleaved sample planes (ISP) during the next acquiring step depending on such sensitivity determination, and calculating a convergence prediction parameter. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

In some implementations, the operations associated with processing of data described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment.

For example, the data processing system 15 can be suitable for the execution of a computer program and can include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

In some implementations, the processes for acquiring a 3D image of a sample structure by acquiring a set of 2D images of differently oriented sample planes described above can be implemented using software for execution on one or more mobile computing devices, one or more local computing devices, and/or one or more remote computing devices. For instance, the software forms procedures in one or more computer programs that execute on one or more programmed or programmable computer systems, either in the mobile computing devices, local computing devices, or remote computing systems (which can be of various architectures such as distributed, client/server, or grid), each including at least one processor, at least one data storage system (including volatile and non-volatile memory and/or storage elements), at least one wired or wireless input device or port, and at least one wired or wireless output device or port.

In some implementations, the software can be provided on a medium, such as a flash memory drive, a CD-ROM, DVD-ROM, or Blu-ray disc, readable by a general or special purpose programmable computer or delivered (encoded in a propagated signal) over a network to the computer where it is executed. The functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Although the present invention is defined in the attached claims, it should be understood that the present invention can also be defined in accordance with the following embodiments:

Embodiment 1: A method to acquire a 3D image of a sample structure by acquiring a set of 2D images of differently oriented sample planes with the following steps:
acquiring a first raw 2D set of 2D images of the sample structure by recording a limited number of 2D image acquisitions at a respectively assigned limited number of raw sample planes (RSP),
calculating a 3D image of the sample structure from the first raw 2D set, the raw 3D image being represented by a 3D volumetric image data set,
extracting a measurement parameter from the 3D volumetric image data set,
assigning the extracted measurement parameter to the number of 2D image acquisitions recorded during the acquisition step,
acquiring a further interleaving 2D set of 2D images of the sample structure by recording a further number of interleaving 2D image acquisitions at a respectively assigned further number of interleaved sample planes (ISP) which do not coincide with the previous acquisition sample planes,
repeating the steps "calculating," "extracting" and "assigning" for the further interleaving 2D set,
comparing the actual ($V_{i+1}$) extracted measurement parameter with the last extracted measurement parameter ($V_i$) to check whether a convergence criterion is met,
in case the convergence criterion is not met, repeating the steps "acquiring," "calculating," "extracting," "assigning" and "comparing" for a further interleaving 2D set including a further number of interleaving 2D image acquisitions at a respectively assigned further number of interleaved sample planes (ISP) which do not coincide with the previous acquisition sample planes, until the convergence criterion is met or until a given maximum number of 2D image acquisitions is recorded, and
outputting the measurement parameter and a total number of recorded 2D image acquisitions.

Embodiment 2: The method of embodiment 1, wherein a sensitivity of a dependency of a value of the measurement parameter from a position of a sample plane is determined and the positions of interleaved sample planes (ISP) during the next acquiring step depending on such sensitivity determination is chosen.

Embodiment 3: The method of embodiment 1 or 2, wherein the steps "calculating" and/or "extracting" and/or "acquiring" are performed in parallel.

Embodiment 4: The method of one of embodiments 1 to 3, wherein a convergence prediction parameter is calculated to determine a next further number of interleaving 2D image acquisitions to be recorded in the next acquisition step to be performed during the method.

Embodiment 5: The method of one of embodiments 1 to 4, wherein additional sample planes are selected to acquire an additional interleaving set of 2D images of the semiconductor structure, the additional sample planes being oriented at high aspect ratio tomography (HART) projection angles.

Embodiment 6: A projection system (1) for acquiring tomographic images of a sample (2) using the method of one of embodiments 1 to 5, the projection system (1) comprising:
a projection light source (3) to generate projection light,
a sample structure holder (4) being rotatable around at least one sample rotation axis (5) for holding the sample in a light path (6) of the projection light, and
a spatially resolving detector (7) to detect the projection light in the light path (6) after the sample (2).

Embodiment 7: The projection system of embodiment 6, comprising an imaging optics (11) to image a sample area (10) illuminated by the projection light to the detector (7).

Embodiment 8: The projection system of embodiment 6 or 7, wherein the projection light has an X-ray wavelength.

Embodiment 9: A data processing system (15) comprising means for acquiring virtual tomographic images of a sample (2) using the method of one of embodiments 1 to 5.

Embodiment 10: The data processing system of embodiment 9, comprising a computer-aided design (CAD) module (16) to process CAD data of the sample (2) to be imaged.

A number of implementations have been described. Nevertheless, it will be understood that various modifications can be made. For example, elements of one or more implementations can be combined, deleted, modified, or supplemented to form further implementations. In addition, other components can be added to, or removed from, the described position measuring device. Accordingly, other implementations are within the scope of the following claims.

What is claimed is:
1. A method to acquire a three-dimensional (3D) image of a sample structure by acquiring a set of two-dimensional (2D) images of differently oriented sample planes with the following steps:
acquiring a first raw 2D subset of 2D images of the sample structure by recording a limited number of 2D image acquisitions at a respectively assigned limited number of raw sample planes (RSP),
calculating a raw 3D image of the sample structure from the first raw 2D subset the raw 3D image being represented by a 3D volumetric image data set,
extracting a measurement parameter from the 3D volumetric image data set,
assigning the extracted measurement parameter to the number of 2D image acquisitions recorded during the acquisition step,
acquiring a further interleaving 2D subset of 2D images of the sample structure by recording a further number of interleaving 2D image acquisitions at a respectively assigned further number of interleaved sample planes (ISP) which do not coincide with the previous acquisition sample planes,
repeating the calculating, the extracting, and the assigning steps for the further interleaving 2D set,
comparing actual extracted measurement parameter, $V_{i+1}$, with last extracted measurement parameter to check whether a convergence criterion is met,
in case the convergence criterion is not met, repeating the acquiring, the calculating, the extracting, and the comparing steps for an additional interleaving 2D subset including an additional number of interleaving 2D image acquisitions at a respectively assigned additional number of interleaved sample planes (ISP) which do not coincide with the previous acquisition sample planes, until the convergence criterion is met or until a given maximum number of 2D image acquisitions is recorded, and
outputting the measurement parameter and a total number of recorded 2D image acquisitions;

wherein the set of 2D images includes the first raw 2D subset of 2D images and the further interleaving 2D subset of 2D images.

2. The method of claim 1, wherein a sensitivity of a dependency of a value of the measurement parameter from a position of one of the sample planes is determined and the positions of the interleaved sample planes (ISP) during the next acquiring step depending on such sensitivity determination is chosen.

3. The method of claim 1, wherein the calculating and/or the extracting and/or the acquiring steps are performed in parallel.

4. The method of claim 1, wherein a convergence prediction parameter is calculated to determine a next further number of interleaving 2D image acquisitions to be recorded in a next acquisition step to be performed during the method.

5. The method of claim 1, wherein additional sample planes are selected to acquire an additional interleaving set of 2D images of the semiconductor structure, the additional sample planes being oriented at high aspect ratio tomography (HART) projection angles.

6. A projection system for acquiring tomographic images of a sample using the method of claim 1, the projection system comprising:
a projection light source to generate projection light,
a sample structure holder being rotatable around at least one sample rotation axis for holding the sample in a light path of the projection light, and
a spatially resolving detector to detect the projection light in the light path after the sample.

7. The projection system of claim 6, comprising an imaging optics to image a sample area illuminated by the projection light to the detector.

8. The projection system of claim 6, wherein the projection light has an X-ray wavelength.

9. A data processing system comprising means for acquiring virtual tomographic images of a sample using the method of claim 1.

10. The data processing system of claim 9, comprising a computer-aided design (CAD) module to process CAD data of the sample to be imaged.

11. The method of claim 2, wherein the calculating and/or the extracting and/or the acquiring steps are performed in parallel.

12. The method of claim 2, wherein a convergence prediction parameter is calculated to determine a next further number of interleaving 2D image acquisitions to be recorded in the next acquisition step to be performed during the method.

13. The method of claim 2, wherein additional sample planes are selected to acquire an additional interleaving set of 2D images of the semiconductor structure, the additional sample planes being oriented at high aspect ratio tomography (HART) projection angles.

14. The projection system of claim 6, wherein the projection system is configured to determine a sensitivity of a dependency of a value of the measurement parameter from a position of a sample plane, and choose the positions of interleaved sample planes (ISP) during the next acquiring step depending on such sensitivity determination.

15. The projection system of claim 6, wherein the projection system is configured to perform the calculating and/or the extracting and/or the acquiring steps in parallel.

16. The projection system of claim 6, wherein the projection system is configured to calculate a convergence prediction parameter to determine a next further number of interleaving 2D image acquisitions to be recorded in a next acquisition step to be performed during the method.

17. The projection system of claim 6, wherein the projection system is configured to select additional sample planes to acquire an additional interleaving set of 2D images of the semiconductor structure, the additional sample planes being oriented at high aspect ratio tomography (HART) projection angles.

18. The data processing system of claim 9, wherein the means for acquiring virtual tomographic images of a sample comprises means for determining a sensitivity of a dependency of a value of the measurement parameter from a position of one of the sample planes, and choosing the positions of interleaved sample planes (ISP) during a next acquiring step depending on such sensitivity determination.

19. The data processing system of claim 9, wherein the means for acquiring virtual tomographic images of a sample comprises means for performing the calculating and/or the extracting and/or the acquiring steps in parallel.

20. The data processing system of claim 9, wherein the means for acquiring virtual tomographic images of a sample comprises means for calculating a convergence prediction parameter to determine a next further number of interleaving 2D image acquisitions to be recorded in a next acquisition step to be performed during the method.

21. The method of claim 1 wherein the measurement parameter comprises at least one of a volume of the sample structure, a height of the sample structure, a width of the sample structure, or a depth of the sample structure.

22. The projection system of claim 6 wherein the measurement parameter comprises at least one of a volume of the sample structure, a height of the sample structure, a width of the sample structure, or a depth of the sample structure.

23. The data processing system of claim 9 wherein the measurement parameter comprises at least one of a volume of the sample structure, a height of the sample structure, a width of the sample structure, or a depth of the sample structure.

24. The method of claim 1 wherein the 2D images of the first raw 2D subset of 2D images of the sample structure are acquired at differently oriented raw sample planes oriented at different angles, and each of the interleaved sample planes is oriented at an angle between angles of two of the raw sample planes.

25. The projection system of claim 6 wherein the 2D images of the first raw 2D subset of 2D images of the sample structure are acquired at differently oriented raw sample planes oriented at different angles, and each of the interleaved sample planes is oriented at an angle between angles of two of the raw sample planes.

26. The data processing system of claim 9 wherein the 2D images of the first raw 2D subset of 2D images of the sample structure are acquired at differently oriented raw sample planes oriented at different angles, and each of the interleaved sample planes is oriented at an angle between angles of two of the raw sample planes.

* * * * *

UNITED STATES PATENT AND TRADEMARK OFFICE
CERTIFICATE OF CORRECTION

PATENT NO. : 11,935,228 B2
APPLICATION NO. : 17/510538
DATED : March 19, 2024
INVENTOR(S) : Ramani Pichumani et al.

Page 1 of 1

It is certified that error appears in the above-identified patent and that said Letters Patent is hereby corrected as shown below:

In the Specification

Column 3
Line 35, delete "2019." and insert -- 2019, --

Column 5
Line 16, delete "imaging optics 1" and insert -- imaging optics 11 --
Line 58, delete "–60 deg." and insert -- –60 deg, --

Column 7
Line 66, delete "value of r" and insert -- value of $\varepsilon$ --

In the Claims

Column 14
Line 38, in Claim 1, delete "subset" and insert -- subset, --
Line 54, in Claim 1, delete "parameter" and insert -- parameter, $V_i$, --

Signed and Sealed this
Ninth Day of July, 2024

Katherine Kelly Vidal
*Director of the United States Patent and Trademark Office*